(12) United States Patent  
Braun et al.

(10) Patent No.: US 6,364,076 B1
(45) Date of Patent: Apr. 2, 2002

(54) WEAR INSERT FOR BRAKE SHOE TRUNNION SLOT

(75) Inventors: David A. Braun, Ft. Wayne, IN (US); Jon Pidwerbecki, Oxford, AL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 08/991,592

(22) Filed: Dec. 15, 1997

(51) Int. Cl.[7] .............................................. F16D 51/16
(52) U.S. Cl. ...................... 188/327; 188/328; 384/296
(58) Field of Search ................................ 188/325, 330, 188/327, 326, 329, 328, 341, 78, 250 A; 74/569; 277/371; 384/280, 282, 276, 296

(56) References Cited

U.S. PATENT DOCUMENTS

| | | | |
|---|---|---|---|
| 742,456 A | * 10/1903 | Laub | 384/296 |
| 1,333,336 A | * 3/1920 | Pack et al. | 384/296 |
| 2,586,009 A | * 2/1952 | Schultz | 308/237 |
| 2,866,668 A | 12/1958 | Bashaw | |
| 3,891,287 A | * 6/1975 | Vogt | 308/237 A |
| 4,206,834 A | * 6/1980 | Williams | 188/341 |
| 4,503,953 A | * 3/1985 | Majewski | 188/330 |
| 4,533,261 A | * 8/1985 | Losio | 384/296 |
| 4,624,348 A | * 11/1986 | Williams | 188/330 |
| 4,679,667 A | * 7/1987 | Zawodni | 188/341 |
| 4,807,729 A | 2/1989 | Sampson | 188/330 |
| 5,062,718 A | * 11/1991 | Lenhard-Backhaus et al. | 384/296 |
| 5,433,531 A | * 7/1995 | Thompson | 384/276 |
| 5,443,135 A | 8/1995 | Redgrave | 188/250 |
| 5,520,466 A | * 5/1996 | Everitt et al. | 384/296 |

FOREIGN PATENT DOCUMENTS

| | | | | |
|---|---|---|---|---|
| GB | 1386253 | * | 3/1975 | 384/296 |
| RU | 204148 | * | 12/1967 | 188/327 |

* cited by examiner

Primary Examiner—Matthew C. Graham
(74) Attorney, Agent, or Firm—Hahn Loeser + Parks LLP

(57) ABSTRACT

A wear insert is provided for receiving trunnions on the ends of pieces used in affixing brake shoes to a brake shoe assembly. A vehicle brake shoe assembly has brake shoes which may be urged outwardly against a brake drum when a S-cam is rotated. The brake shoe has an arcuate brake table on which friction liners are installed. A brake web, comprising a pair of brake web elements, extends inwardly from the brake table toward the center of radius of the arcuate brake table. Each of these spaced apart web elements has a first and a second end, and each of the ends is provided with a trunnion receiving slot. The trunnion receiving slots at one end receive the trunnions of an anchor pin, and the trunnion receiving slots at the other end receive the trunnions of a cam follower. The wear insert is removably seated in at least one of the trunnion slots to be interposed between the slot and the trunnion. When a hardened spring steel is used for the wear insert, the insert will reduce the wear upon the slot, thereby extending the life of the brake shoe. The preferred wear insert is a U-shaped sleeve with radial lips at the ends to prevent axial movement of the sleeve in the trunnion receiving slot.

8 Claims, 2 Drawing Sheets

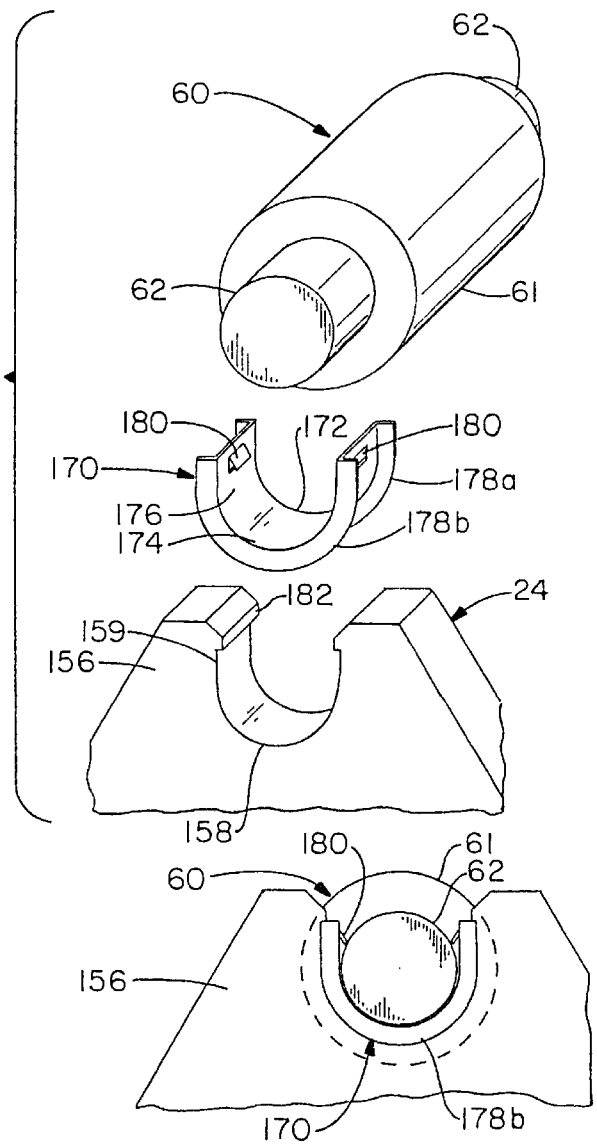
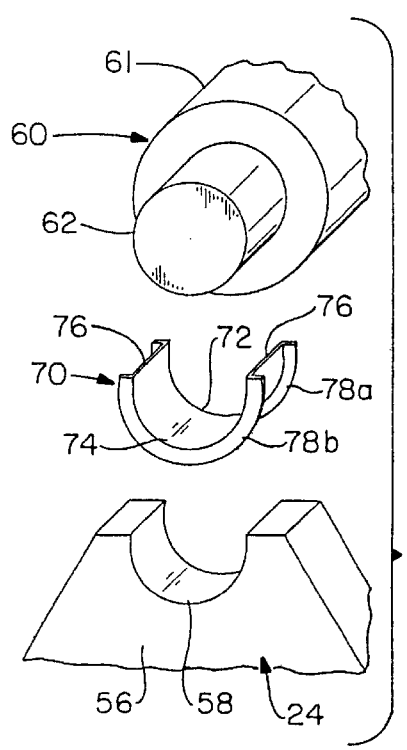
FIG.-3
FIG.-4
FIG.-2

WEAR INSERT FOR BRAKE SHOE TRUNNION SLOT

The present invention relates to a brake shoe for a vehicle drum brake. More particularly, the present invention relates to a brake shoe having trunnion-receiving slots at each end of the brake shoe for receiving a trunnion. Even more, particularly, the invention relates to a brake shoe in which an insert is removably seated in at least one of the trunnion-receiving slots for the purpose of providing a hardened slot for receiving the trunnion, thereby preventing direct wear of the slot resulting in replacement of the brake shoe.

BACKGROUND OF THE ART

In a well-known method of expanding the brake shoes of a drum brake to frictionally contact the brake drum of a wheel, a pair of opposed brake shoe assemblies have brake shoe webs which carry brake tables on which frictional braking material is mounted. One end of each of the brake shoe webs is pivotally mounted by an anchor pin to the axle, usually by means of a brake spider. The anchor pin is typically provided with trunnions which mate into trunnion-receiving slots on the brake shoe end. The other end of each of the brake shoe assemblies is held in contact with a brake actuator, typically by a biasing means. When the operator of the vehicle engages the brakes, the brake actuator rotates and its shape causes the moves the braking surfaces to be forced outwardly against the biasing force into frictional contact with the brake drum, which rotates with the wheel. The brake actuator often has a cam element for this purpose, often shaped in a "S" or wedge shape. To facilitate the contacting of the brake shoe assembly with the S-cam, the end of the brake shoe that is in contact with the is brake actuator usually provided with a cam follower. This cam follower also has trunnions on its ends, which are rotatably fixed to the brake shoe in trunnion receiving slots. Significant forces are generated in the operation of the brakes, and unless there is some hardening of the ribs which make up the brake web of the brake shoe assembly, it is often the ribs and specifically the cam trunnion receiving slot which ultimately bears the load of these forces, resulting in wear. If this occurs, the entire brake shoe must be replaced. Hardening of a portion of the brake shoe assembly is difficult and expensive. It is desirable to provide a hardened insert for the trunnion receiving slot to provide a seat for the trunnions without having to harden the brake shoe ribs. Although the problem of wear is not as great at the anchor pin end of the brake shoe, prolonging the life of the brake shoe at each end of the web is a desirable goal.

In one known piece of the prior art, the cam follower has its trunnions retained in an open-sided arcuate bearing surface by a wire retainer and there is no apparent teaching of any need or desirability to harden these bearing surfaces. In another known piece of the prior art, an insert is taught which is replaceably mounted in the ends of the ribs of the brake shoe and provides a hardened trunnion receiving slot. Because of the modular nature of the insert, it may be heat-treated to harden it without a need to heat-treat the entire brake shoe.

SUMMARY OF THE INVENTION

It is therefore an object of the present invention to provide a specially hardened insert for a trunnion receiving slot on a brake shoe assembly, such that the insert is interposed between the slot and the trunnion of either an anchor pin or a cam follower when the trunnion is mounted in the slot.

These and other objects of the present invention are provided by a brake shoe for use in a S-cam type vehicle drum brake such that the brake shoe can be urged outwardly against a brake drum when an S-cam is rotated. The brake shoe comprises an arcuate brake table with at least one friction brake pad for contacting a brake drum affixed to one side of the brake table and a brake web attached to the opposing side of the brake table. The brake web extends inwardly toward the center of radius of the arcuate brake table and comprises a pair of spaced apart web elements having a first and a second end. The second end of each of the pair of web elements has a trunnion receiving slot for receiving a trunnion of an anchor pin and the first end of each of the pair of the web elements has a trunnion receiving slot for receiving a trunnion of a cam follower. In the brake shoe of the invention, at least one of the trunnion receiving slots has a wear insert removably seated therein for interposition between the slot and the trunnion.

BRIEF DESCRIPTION OF THE DRAWINGS

Better understanding of the present invention will be had when reference is made to the accompanying drawings and the detailed description describing them, wherein identical parts are identified by identical reference numerals and wherein:

FIG. 2 shows an enlarged exploded perspective view of a brake web end employing a first embodiment of the present invention;

FIG. 3 shows an enlarged exploded perspective view of a brake web end employing a second embodiment of the present invention; and FIG. 4 is an assembled end view of the brake end of FIG. 3 using the second embodiment.

DETAILED DESCRIPTION OF THE PREFERRED EMBODIMENT

Figure 1:
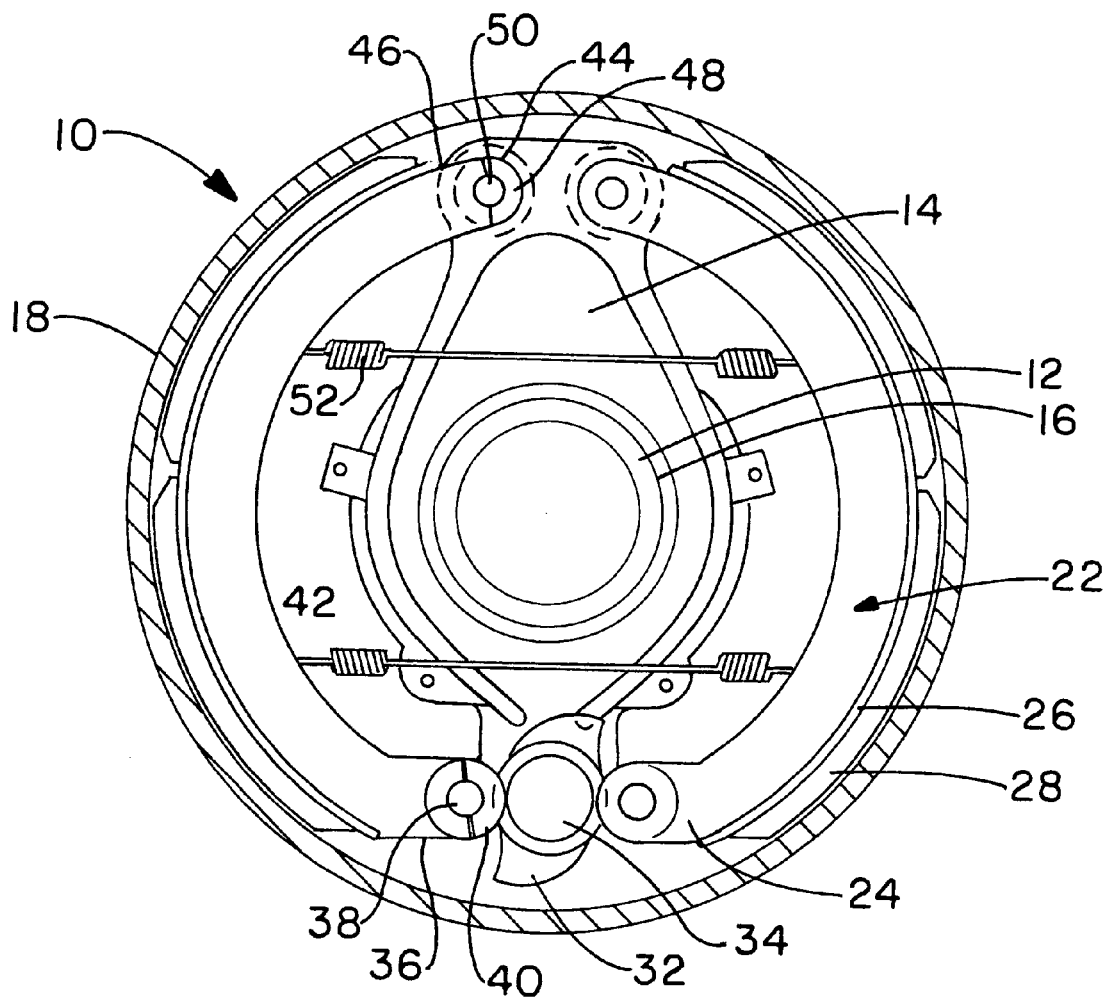
FIG. 1 shows a side elevation view of a prior art wheel assembly.

FIG. 1 shows a drum brake assembly 10 as is generally known in the prior art. It is typical of the type of brake found on heavy duty trucks and trailers. The drum brake assembly 10 is supported on an axle 12 by a spider 14 which is rigidly affixed, as by welding, to the axle. The spider 14 has a central opening 16 through which the axle 12 passes and the edges of the opening provide a site for the welding of the spider to the axle. A brake drum 18 surrounds the rest of the assembly and is affixed to a wheel (not shown) which is rotatably mounted to a spindle of the axis in a manner well known in the art. The brake spider, by contrast, does not rotate. A pair of brake shoes 22 is included in the brake assembly. Each of the brake shoes 22 has a pair of axially spaced webs 24 secured to a brake table 26 on which brake friction pads 28 are rigidly mounted. The webs 24 are flat in a radial direction and curved in a longitudinal or circumferential direction. The brake table 26 is curved in the circumferential direction and the webs 24 are welded in a parallel relationship along the interior curved portion of the table. The brake friction pads 28 are secured to the brake table by rivets, chemical bonding or the like.

Selective outward movement of the brake shoes 22 produces frictional engagement of the friction pads with the inside surface of the brake drum. This outward movement is achieved by a brake actuator, which includes a cam 32 which is rigidly secured to a cam shaft 34, which passes through an aperture in the spider 14. When the cam shaft 34 is rotated by known brake means (not shown), the cam's shape causes the selective outwardly movement of the brake shoes. This occurs because a first end 36 of each of the brake shoes, and particularly the brake shoe webs 24, is provided with an opening 38 in which a roller or cam follower 40 may be seated. Each of the cam followers 40 bears directly in a rolling engagement against the cam 32. Holding the cam follower 40 in that engaged position is a first biaser 42, usually a spring, which connects each of the brake shoes 22, near the first end 36. As the cam shaft 34 turns and the cam 32 rotates, the force of first biaser 42 is overcome and the brake tables 26 move outwardly, but as the cam rotates back to its normal, non-actuated position, the tables move inwardly, disengaging the brake drum 18.

The end of the spider 14 opposite the cam 32 is axially offset from the end which receives the cam. This offset permits the spider 14 to be interposed between the spaced apart webs 24 of the respective brake shoes 22. At least one boss 44 is provided at this end of the spider 14, for the purpose of securing a second end 46 of the brake shoes 22 to the spider through the use of an anchor pin 48. The second end 46 of each brake shoe web is provided with an opening 50, comprising either an aperture or a slot, for accepting the ends of the anchor pin 48, which extend axially outward from the boss. In the particular embodiment shown in FIG. 1, two such bosses 44 are provided, so that each brake shoe 22 has its own anchor pin 48. In other known embodiments (usually involving less strenuous service), a single boss and anchor pin may be used, with each of the brake shoes having its slot 50 engaging a portion of the circumference of the ends of the single anchor pin. In such a case, an open slot 50 is used rather than a closed aperture. When two bosses and anchor pins are employed, as in FIG. 1, the brake webs may have either a closed aperture or an open slot. The anchor pin or pins 48 provide a pivot point about which end 46 of the brake shoe is able to make the outward braking movement described above. A second biaser 52, usually a spring like the first biaser 42, connects each of the brake shoes 22, near the second end 46, urging the brake tables into the non-actuated inward position in the same manner as the first biaser.

It is with this understanding of the prior art that the present invention may now be described.

FIG. 2 shows a first embodiment of the present invention in an exploded perspective view. A brake shoe web 24 of the type described above has an end 56 which may represent either a first end 36 or a second end 46 as described above. The end 56 has an opening 58 of the type identified above as opening 38 or 50. In the specific embodiment shown in FIG. 2, opening 58 is a trunnion-receiving slot rather than a closed aperture for receiving a trunnion. A roller 60 is shown. It has a roller body 61 provided at each end with a trunnion 62. The roller 60 can represent either a cam follower 40 or an anchor pin 48 as described above, since either would have trunnions of the type shown as trunnion 62 and need to be seated in a web end opening of the type shown as opening 58. Rather than seating the trunnion 62 directly into the opening 58, as would be known in the prior art, a wear insert 70 is interposed between the opening and the trunnion. The wear insert 70 is a U-shaped sleeve 72, typically formed from a hardened metal, particularly a steel and more particularly a spring steel. The U-shaped sleeve 72 will have a length sufficiently long to span the length of the opening 58. The sleeve 72 has a lower rounded portion 74 which is essentially a semicylindrical annulus and a pair of arm portions 76 which extend upwardly from the lower portion. The arm portions are substantially parallel to each other, but may open slightly away from each other rather than closing slightly toward each other. It is preferred to provide at least one radial lip 78 at an end of the sleeve, and it is even more preferred to provide a second such radial lip at the opposite end. The embodiment shown in FIG. 2 shows two such radial lips 78a and 78b. These radial lips 78 are spaced apart sufficiently to allow a frictional fit of the wear insert 70 into opening 58. When only one radial lip 78 is used, the preferred manner of use is to provide radial lip 78a, which is the lip at the end of the opening 58 where the main body portion 61 of roller 60 is located. In addition to securing the wear insert in the slot or opening 58, the radial lips 78 prevent axial movement of the opening. To further assist the seating of the wear insert 70 in the slot or opening 58, the radius of curvature of the outside surface of sleeve 72 will closely conform to the radius of curvature of the inside surface of opening 58. If the arm portions 76 of the wear insert 70 spread apart slightly from parallel as they extend upwardly, this will assist in the friction fit of the insert in the opening. The inside radius of curvature of the lower portion 74 should be substantially the radius of curvature of the trunnion 62 to be received therein. When the arm portions 76 bear against the opening, they help in preventing rotational motion of the wear insert in opening 58. Clearly, prevention of both axial and rotational movement of the wear insert 70 in opening 58 is highly desired. A wear insert 70 is very useful in association with the second end 46 of a brake shoe 22, where the opening 58 is a opening such as opening 50 and the trunnion-bearing roller 60 is an anchor pin 48.

FIGS. 3 and 4 show a second embodiment of the present invention in an exploded perspective view and an assembled end view, respectively. A brake shoe web 24 of the type described above has an end 156 which may represent either a first end 36 or a second end 46 as described above. The end 156 has an opening 158 of the type identified above as opening 38 or 50. In the specific embodiment shown in FIGS. 3 and 4, opening 158 is a trunnion-receiving slot rather than a closed aperture for receiving a trunnion. A roller 60 is shown. It has a roller body 61 provided at each end with a trunnion 62. The roller 60 can represent either a cam follower 40 or an anchor pin 48 as described above, since either would have trunnions of the type shown as trunnion 62 and need to be seated in a web end opening of the type shown as opening 158. Rather than seating the trunnion 62 directly into the opening 158, as would be known in the prior art, a wear insert 170 is interposed between the opening and the trunnion. The wear insert 170 is a U-shaped sleeve 172, typically formed from a hardened metal, particularly a steel and more particularly a spring steel. The U-shaped sleeve 172 will have a length sufficiently long to span the length of the opening 158. The sleeve 172 has a lower rounded portion 174 which is essentially a semicylindrical annulus and a pair of arm portions 176 which extend upwardly from the lower portion. The arm portions 176 are substantially parallel to each other, but may open slightly away from each other rather than closing slightly toward each other. It is preferred to provide at least one radial lip 178 at an end of the sleeve, and it is even more preferred to provide a second such radial lip at the opposite end. The embodiment shown in FIGS. 3 and 4 show two such radial lips 178a and 178b. These radial lips 178 are spaced apart sufficiently to allow a frictional fit of the wear insert 170 into opening 158. When only one radial lip 178 is used, the preferred manner of use is to provide radial lip 178a, which is the lip at the end of the opening 158 where the main body portion 61 of roller 60 is located. In addition to securing the wear insert in the slot or opening 158, the radial lips 178 prevent axial movement of the opening. To further assist the seating of the wear insert 170 in the slot or opening 158, the radius of curvature of the outside surface of sleeve 172 will closely conform to the radius of curvature of the inside surface of opening 158. If the arm portions 176 of the wear insert 170 spread apart slightly from parallel as they extend upwardly, this will assist in the friction fit of the insert in the opening. The inside radius of curvature of the lower portion 174 should be substantially the radius of curvature of the trunnion 62 to be received therein. When the arm portions 176 bear against the opening, they help in preventing rotational motion of the wear insert in opening 158. Clearly, prevention of both axial and rotational movement of the wear insert 170 in opening 158 is highly desired.

The difference between the wear insert 70 of FIG. 2 and wear insert 170 of FIGS. 3 and 4 is due to a difference in the slots 58 and 158 respectively in which the wear inserts would be inserted. Slot or opening 58 is illustrated as being essentially semicircular with only a small portion of the slot comprising what are effectively parallel arms 59 which deepen or elongate the slot at the open end of the slot. By contrast, slot or opening 158 is a much deeper or more elongate slot in which arms 159 are longer than arms 59. This type of slot 158 will be more commonly found in conjunction with seating of a roller 60 in the nature of cam follower 40 rather than anchor pin 48, since the trunnions 62 on cam follower 40 will necessarily rotate in the slot. Two accommodations are made for this rotation. First, a pair of opposed inwardly extending tabs 180 are provided along the length of the U-shaped sleeve 172, especially in the arm portions 176 to retain the trunnion 62 in the sleeve. When the tabs are placed in the arm portions, especially relatively proximate to the semicircular lower portion 174, the tabs 180 may extend far enough into the interior volume to bear against and retain the upper half of the cylindrical trunnion 62 seated therein, as is shown in FIG. 4. The second accommodation is to provide the upper ends 159 of slot 158 with inward projections 182 for retaining the wear insert in the trunnion receiving slot 158. Since wear insert 170 is preferably formed from a hardened spring-type material such as a spring steel and is relatively thin so as to possess some flexibility, wear insert 170 may be easily snapped into the position shown in FIG. 4.

For these reasons, a wear insert 170 is very useful in association with the first end 36 of a brake shoe 22, where the opening 158 is a opening such as opening 38 and the trunnion-bearing roller 60 is an cam follower 40.

Two advantages provided by the present invention are the ability to eliminate a retainer, particularly a wire type retainer as is known in the art to hold cam follower trunnions in the trunnion-receiving slot. Another advantage is the ability to effectively harden the interior of the brake shoe end slots, thereby prolonging life, without the need to put the brake shoe webs 24 through any sort of hardening process.

It will of course be understood that the first and second embodiments of the present invention may be practiced together or separately in a given wheel brake assembly, so long as at least one of the trunnion receiving slots in the assembly has a wear insert of the present invention seated therein for interposition between the slot and the trunnion.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A brake shoe for use in a S-cam type vehicle drum brake such that the brake shoe can be urged outwardly against a brake drum when an S-cam is rotated, the brake shoe comprising:

an arcuate brake table having a first and a second side, the first side supporting a friction brake pad for contacting a brake drum;

a brake web attached to the second side of the brake table extending inwardly toward the center of radius of the arcuate brake table, the web comprising a pair of spaced apart web elements having a first and a second end;

the second end of each of the pair of web elements having a trunnion receiving slot for receiving a trunnion of an anchor pin; and the first end of each of pair of the web elements having a trunnion receiving slot for receiving a trunnion of a cam follower;

wherein at least one of the trunnion receiving slots has a wear insert removably seated therein for interposition between the slot and the trunnion.

2. The brake shoe of claim 1 wherein the wear insert is formed from a hardened steel.

3. The brake shoe of claim 2 wherein the wear insert is formed from a spring steel.

4. The brake shoe of claim 1 wherein the wear insert is a U-shaped sleeve.

5. The brake shoe of claim 4 wherein the U-shaped sleeve has a first and a second radial lip to prevent axial movement of the sleeve in the trunnion receiving slot.

6. The brake shoe of claim 4 wherein the U-shaped sleeve has a pair of opposed inwardly extending tabs to retain the trunnion in the sleeve.

7. The brake shoe of claim 1 wherein the trunnion receiving slot has a projection formed along the sides of the slot opening for retaining the wear insert in the trunnion receiving slot.

8. A brake shoe for use in a S-cam type vehicle drum brake such that the brake shoe can be urged outwardly against a brake drum when an S-cam is rotated, the brake shoe comprising:

an arcuate brake table having a first and a second side, the first side supporting a friction brake pad for contacting a brake drum;

a brake web attached to the second side of the brake table extending inwardly toward the center of radius of the arcuate brake table, the web comprising a pair of spaced apart web elements having a first and a second end;

the second end of each of the pair of web elements having a trunnion receiving slot for receiving a trunnion of an anchor pin, the trunnion receiving slot having a length across the web element; and the first end of each of pair of the web elements having a trunnion receiving slot for receiving a trunnion of a cam follower, the trunnion receiving slot having a length across the web element;

wherein at least one of the trunnion receiving slots has a wear insert removably interposed between the slot and the trunnion, the wear insert spanning the length of the slot.

\* \* \* \* \*